(12) United States Patent
Pagano

(10) Patent No.: US 9,119,502 B2
(45) Date of Patent: Sep. 1, 2015

(54) BREWING APPARATUS FOR A MACHINE FOR PREPARING BEVERAGES

(75) Inventor: Gaetano Pagano, Florence (IT)

(73) Assignee: LUIGI LAVAZZA S.P.A., Turin (IT)

( * ) Notice: Subject to any disclaimer, the term of this patent is extended or adjusted under 35 U.S.C. 154(b) by 358 days.

(21) Appl. No.: 13/700,899

(22) PCT Filed: May 31, 2011

(86) PCT No.: PCT/IB2011/052388
§ 371 (c)(1),
(2), (4) Date: Nov. 29, 2012

(87) PCT Pub. No.: WO2011/151787
PCT Pub. Date: Dec. 8, 2011

(65) Prior Publication Data
US 2013/0068110 A1 Mar. 21, 2013

(30) Foreign Application Priority Data
Jun. 1, 2010 (IT) .............................. TO2010A0461

(51) Int. Cl.
*A47J 31/36* (2006.01)
(52) U.S. Cl.
CPC .......... *A47J 31/3638* (2013.01); *A47J 31/3623* (2013.01)
(58) Field of Classification Search
CPC ......................... A47J 31/3638; A47J 31/3623
USPC ........................... 99/289 R, 295, 302 P, 302 R
See application file for complete search history.

(56) References Cited

U.S. PATENT DOCUMENTS 5,479,848 A * 1/1996 Versini ............................ 99/287
5,794,519 A * 8/1998 Fischer .......................... 99/295

(Continued)

FOREIGN PATENT DOCUMENTS

EP     1 900 314 A1    3/2008
WO    2007/031378 A2  3/2007

(Continued)

OTHER PUBLICATIONS

International Search Report of PCT/IB2011/052388 dated Nov. 2, 2011.

*Primary Examiner* — Reginald L Alexander
(74) *Attorney, Agent, or Firm* — Sughrue Mion, PLLC

(57) ABSTRACT

The brewing apparatus (1) comprises a guide and support structure (2), and bears a movable receiving assembly (7) provided with a receptacle (9) capable of receiving a capsule (10) or similar, containing a quantity or measure of a substance for the preparation of a beverage, and a substantially stationary cooperating assembly (6); the movable assembly (7) being able to assume a closed position in which it is coupled with the cooperating assembly (6) to define a brewing chamber able to contain a capsule (10), and a separated open position. The cooperating assembly (6) is able to inject water and/or steam into the brewing chamber. An ejection device (20) is provided to eject a used capsule (10) from the region between said assemblies (6, 7) when, after the beverage has been prepared, the movable assembly (7) returns from the closed position to the open position.

The ejection device includes an ejecting member (20) mounted pivotingly on the movable assembly close to the receptacle (9) along a path intersecting that region, between an idle position in which it allows a capsule (10) to be inserted into said region, and a working position in which it is able to push a used capsule (10) downwards to eject it from said region, a control mechanism (24; 26-34) on the structure (2) cooperating with the movable assembly (7) to cause the ejecting member (20) to move from the idle position to the working position each time the movable assembly (7) is in a predetermined position when returning to the open position.

5 Claims, 9 Drawing Sheets

(56) References Cited

U.S. PATENT DOCUMENTS

| | | | |
|---|---|---|---|
| 6,857,353 B2 * | 2/2005 | Kollep et al. | 99/289 R |
| 2009/0007794 A1 * | 1/2009 | Cortese | 99/289 R |
| 2010/0173053 A1 * | 7/2010 | Ryser et al. | 426/431 |

FOREIGN PATENT DOCUMENTS

| | | |
|---|---|---|
| WO | 2010/004376 A1 | 1/2010 |
| WO | 2010/076765 A2 | 7/2010 |

* cited by examiner

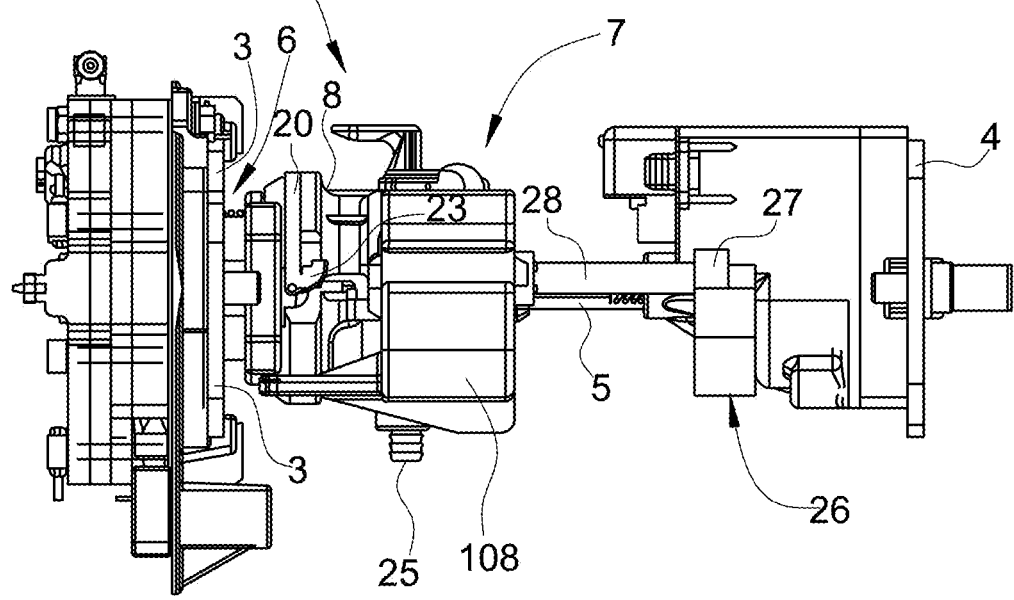
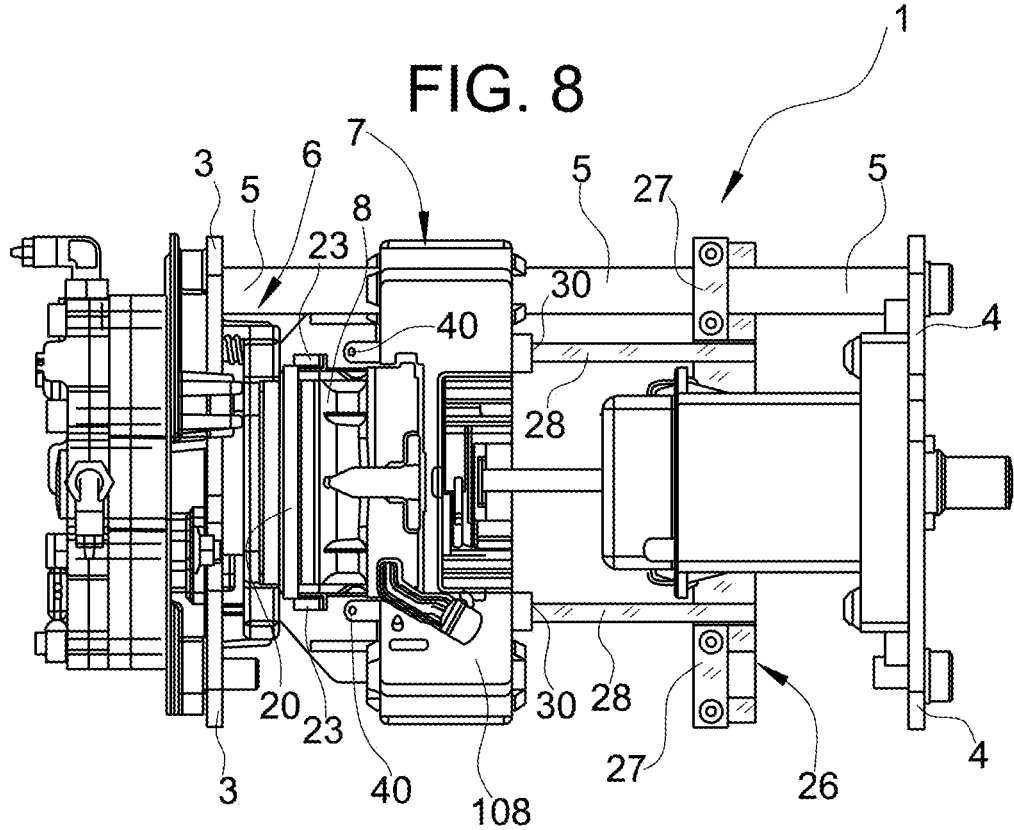

BREWING APPARATUS FOR A MACHINE FOR PREPARING BEVERAGES

CROSS REFERENCE TO RELATED APPLICATIONS

This application is a National Stage of International Application No. PCT/IB2011/052388 filed May 31, 2011, claiming priority based on Italian Patent Application No. TO2010A000461 filed Jun. 1, 2010, the contents of all of which are incorporated herein by reference in their entirety.

This invention relates to a brewing apparatus for a machine for preparing beverages, in particular coffee.

More specifically, the invention relates to a brewing apparatus comprising an operationally stationary guide and support structure, which bears a movable receiving assembly provided with a receptacle capable of receiving a capsule or similar, containing a quantity or measure of a substance for the preparation of a beverage, and a substantially stationary cooperating assembly; the movable assembly being able to assume a closed position in which it is coupled to the cooperating assembly, to define a brewing chamber able to contain a capsule, and a separated open position; the cooperating assembly being able to inject water and/or steam into the brewing chamber; ejecting means being provided to eject a used capsule from the region between said assemblies when, after the beverage has been prepared, the movable assembly returns from the closed position to the open position.

One purpose of this invention is to propose such an improved brewing assembly.

This and other objectives are achieved by the invention with a brewing apparatus of the type specified above, characterised in that the aforementioned ejecting means comprise an ejecting member mounted pivotingly on the movable assembly close to said receptacle along a path intersecting said region, between an idle position in which it allows a capsule to be inserted into said region, and a working position in which it is able to push a used capsule downwards to eject it from said region; and a control mechanism on said structure cooperating with the movable assembly to cause the ejecting member to move from the idle position to the working position each time the movable assembly is in a predetermined position on a return path to the open position.

In one embodiment the aforementioned receptacle of the movable assembly has a substantially circular aperture, and the ejecting member has an essentially semi-circular shape and is mounted pivotingly close to the aperture of said receptacle around an axis that is at least approximately horizontal.

Advantageously, said ejecting member can have at least one control arm, and the control mechanism is capable of interacting with said at least one arm, to cause the ejecting member to move to the working position when the movable assembly is in said predetermined position on a return path to the open position.

Further characteristics and advantages of the invention are set out in the detailed description below, provided purely as a non-limiting example, with reference to the attached drawings, in which:

FIGS. 7 and 8 are side and top views respectively of the brewing apparatus according to the preceding figures, shown with the movable assembly in the closed position;

Figure 1:
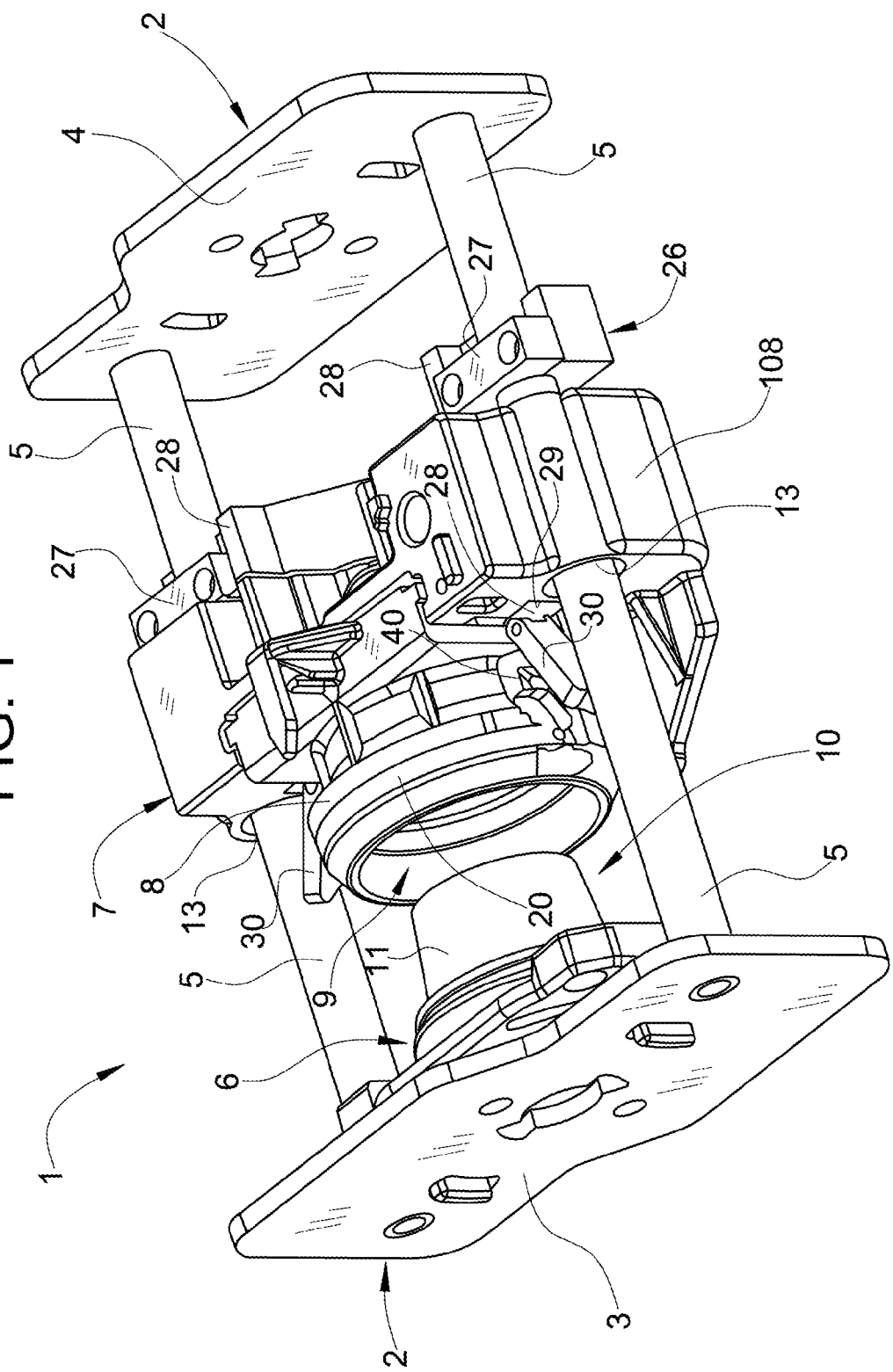
FIG. 1 is a partial perspective view of a brewing assembly according to this invention.

In the drawings a brewing apparatus according to the invention for a machine for preparing beverages, in particular hot beverages, such as coffee, is marked as a whole as 1.

The brewing apparatus 1 is intended to be built into a machine for preparing beverages of a type known and therefore not illustrated.

In the embodiment illustrated by way of example the brewing apparatus 1 includes a support and guide structure, indicated as a whole as 2. This structure 2 is operationally stationary and includes two opposing header plates 3 and 4 interconnected by means of a pair of preferably cylindrical parallel rods 5.

A substantially stationary cooperating assembly 6, located near to the header plate 3, and a movable receiving assembly 7, movable along the rods 5, are connected to the support structure 2.

The receiving assembly 7 includes a main body 108 (shown in particular in FIG. 2) in which is assembled detachably an essentially cup-shaped body 8. The body 8 contains a cavity 9 able to accommodate a pod or a capsule (or similar) containing a quantity or measure of a substance for preparing a drink, such as ground roasted coffee. Such a capsule is marked as 10 in FIGS. 1, 5, 9 and 11.

The capsule 10 shown is of a known type, and essentially comprises a cup body 11, for example made of moulded plastic, closed with a radially protruding sealing cover 12.

As mentioned above, the cooperating assembly 6 is connected to the end plate 3, while the movable assembly 7 is assembled movingly along the rods 5 from and towards the cooperating assembly 6. For this purpose, two parallel through-holes 13 are made in the main body 108 of the movable assembly 7, into which the rods 5 extend (shown in particular in FIGS. 1, 2 and 2a).

The movement of the movable assembly 7 towards the cooperating assembly 6 is advantageously commanded by an electrical actuator, of a known type, for example a linear actuator. The return movement may be commanded by one or more elastic means.

Figure 3:
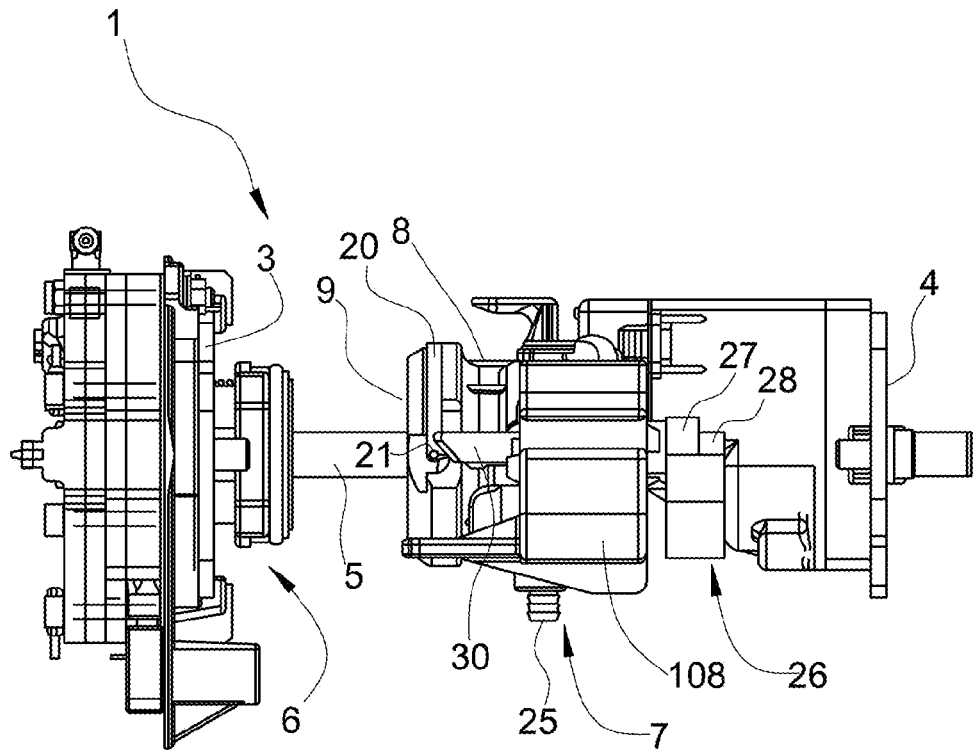
FIGS. 3 and 4 are partial side and top views respectively of the brewing apparatus shown with the movable assembly in the open position.
Figure 4:
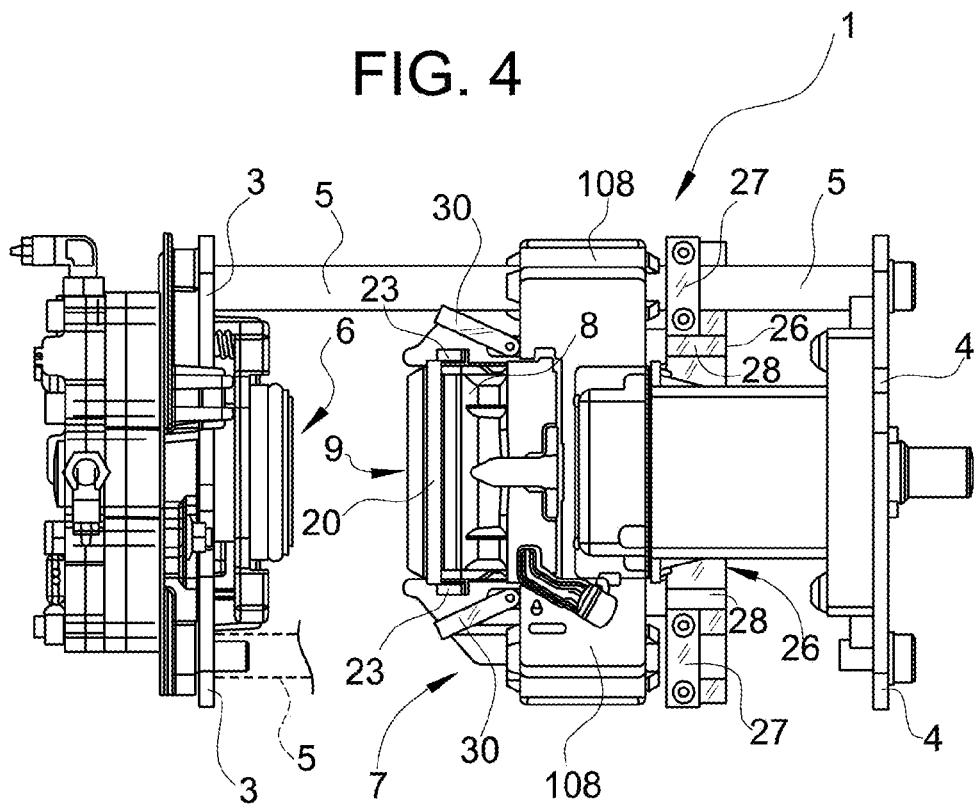

The movable assembly 7 is in particular able to assume a relative separated open position, as shown in FIGS. 3 and 4, in which a capsule 10 inserted into the machine can be placed between the assemblies 6 and 7, where it is for example held by means of a jawed retaining device of a known type that is not illustrated.

Figure 5:
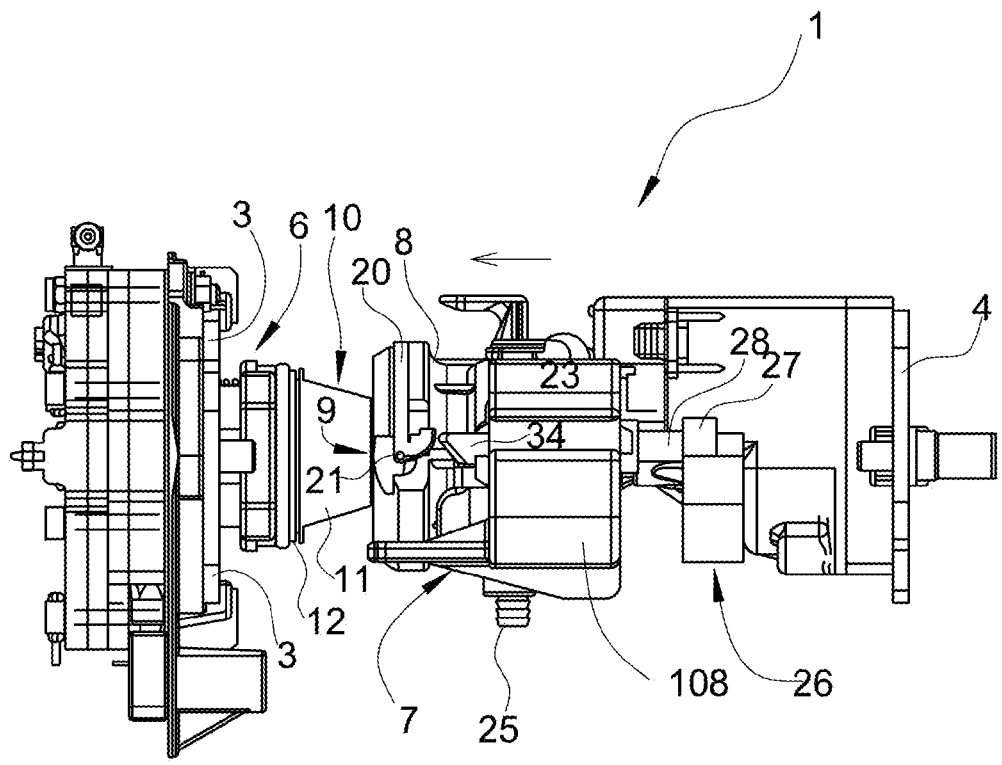
FIGS. 5 and 6 are partial side and top views respectively of the brewing apparatus according to the preceding figures, shown with the movable assembly in an intermediate position between the open position and the closed position.
Figure 6:
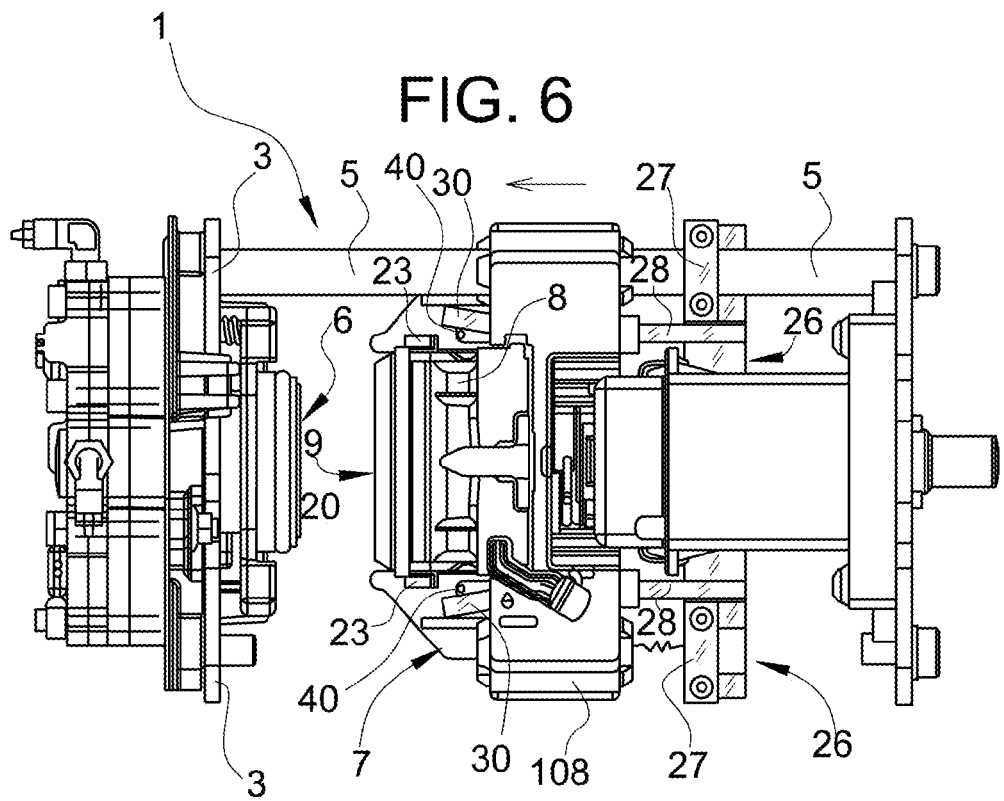

Activation of the actuator associated with the movable assembly 7 is then able to cause a movement of that assembly 7 towards the cooperating assembly 6, until it reaches a closed position as shown in FIGS. 7 and 8, passing through a plurality of intermediate positions, one of which is shown in FIGS. 5 and 6.

In the intermediate position shown in FIGS. 5 and 6 the capsule or pod 10 is about to be released from the associated retaining device, and to be "caught" between the assemblies 6 and 7, entering the cavity 9 of the body 8 of the movable assembly 7.

In the closed position (FIGS. 7 and 8) the assemblies 6 and 7 are joined to one another in a fluid-tight manner, and define a closed brewing chamber in which the capsule 10 is held.

The cooperating assembly 6 in a known manner is able to perforate the cover 12 of the capsule enclosed in the brewing chamber and to inject into that capsule a stream of water and/or steam.

The movable assembly 7 is however (also in a known manner) arranged to perforate the bottom wall of the capsule or pod 10 enclosed in the brewing chamber.

Figure 2:
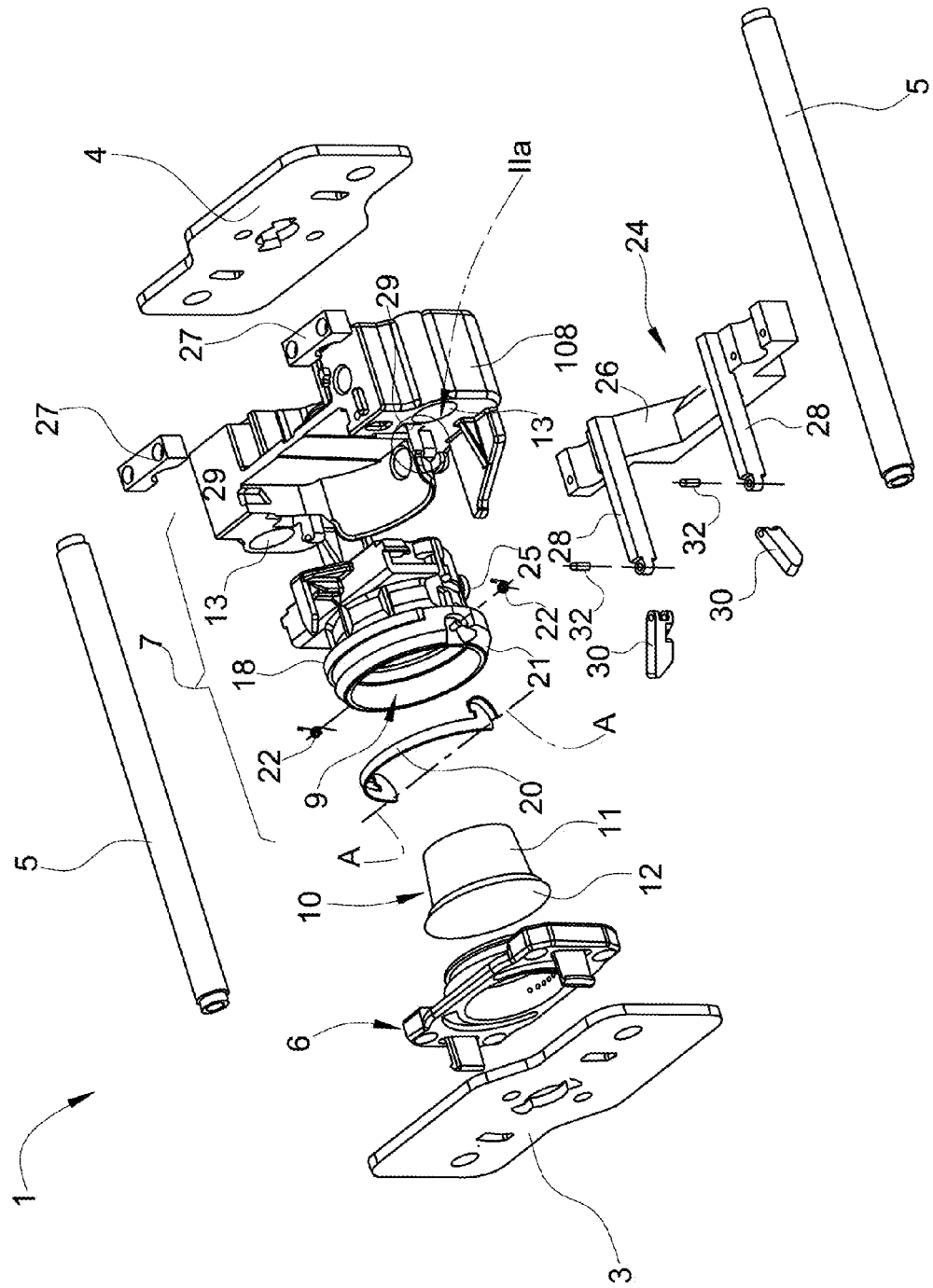
FIG. 2 is an exploded perspective view of the brewing apparatus according to FIG. 1.
Figure 2A:
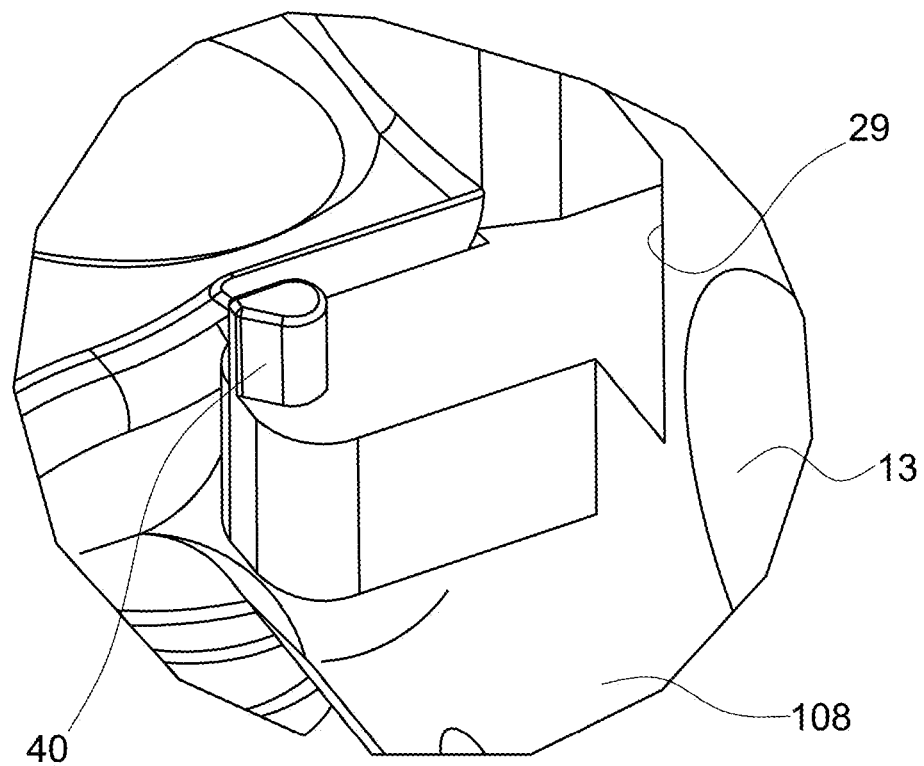
FIG. 2a is a partial close-up perspective view of a detail of FIG. 2.

The beverage made by the brewing can fall into the collection recipient (not illustrated), such as a cup, through a dispensing pipe 25 arranged in the movable assembly 7 and communicating with the cavity 9 which cooperates to form the brewing chamber (shown for example in FIGS. 2 and 3).

For further details on the coupling means between the assemblies 6 and 7, as well as between the bodies 8 and 108 of the movable assembly 7, reference may be made for example to the Italian patent application TO2008A001007 filed by the same applicant.

Once the beverage has been dispensed, the movable assembly 7 is again withdrawn from the cooperating assembly 6 and the used capsule 10 should be "discharged" by gravity and subsequently ejected. It is however possible that a used capsule remains attached to the perforation device of the assembly 6 or 7, and that its dropping and subsequent ejection may be hindered or even prevented.

To obviate this drawback, the brewing apparatus according to the invention is provided with a specific ejection device, described below.

The ejection device includes an ejecting member marked as 20 in the drawings. In the sample embodiment shown, the receptacle 9 of the movable assembly 7 has a substantially circular aperture (FIGS. 1 and 2) and the ejecting member 20 has an essentially semi-circular shape, and is mounted pivotingly close to the aperture of said receptacle 9, around an axis that is at least approximately horizontal, shown as A-A in FIG. 2.

With particular reference to FIG. 2, the ends of the ejecting member 20 are articulated pivotingly around two pivots 21 of the body 8 (of which only one is visible in that figure), with related torsion springs 22 that tend to keep said ejecting member 20 in the idle position (shown for example in FIGS. 1 and 3) in which it enables a capsule 10 to be inserted into the region between the assemblies 6 and 7.

As explained in greater detail below, the ejecting member 20 is able to complete an arched trajectory, around the axis A-A, intersecting the region between the assemblies 6 and 7, between the idle position defined above and a working position (shown in FIGS. 11 and 12) in which it is able to push a used capsule 10 down, to eject it from the region between the assemblies 6 and 7.

Figure 11:
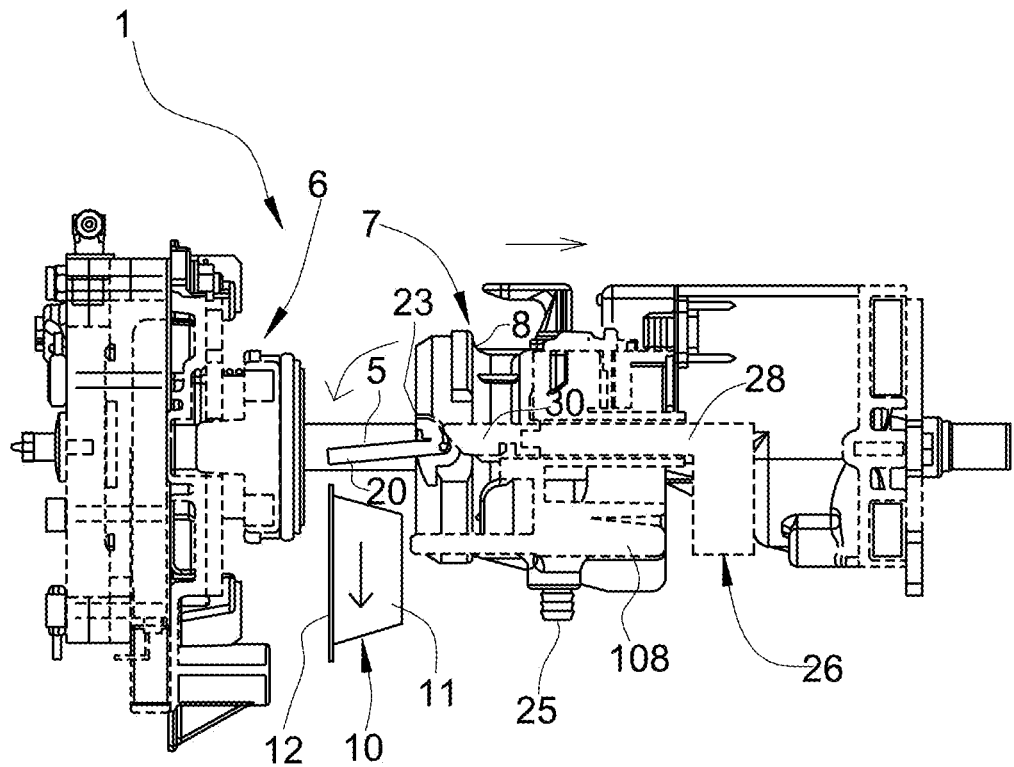
FIGS. 11 and 12 are side and top views respectively of the brewing apparatus shown with the movable assembly in a final phase on a return path to the open position, in a state in which the ejecting member provides for the ejection of the used capsule.
Figure 12:
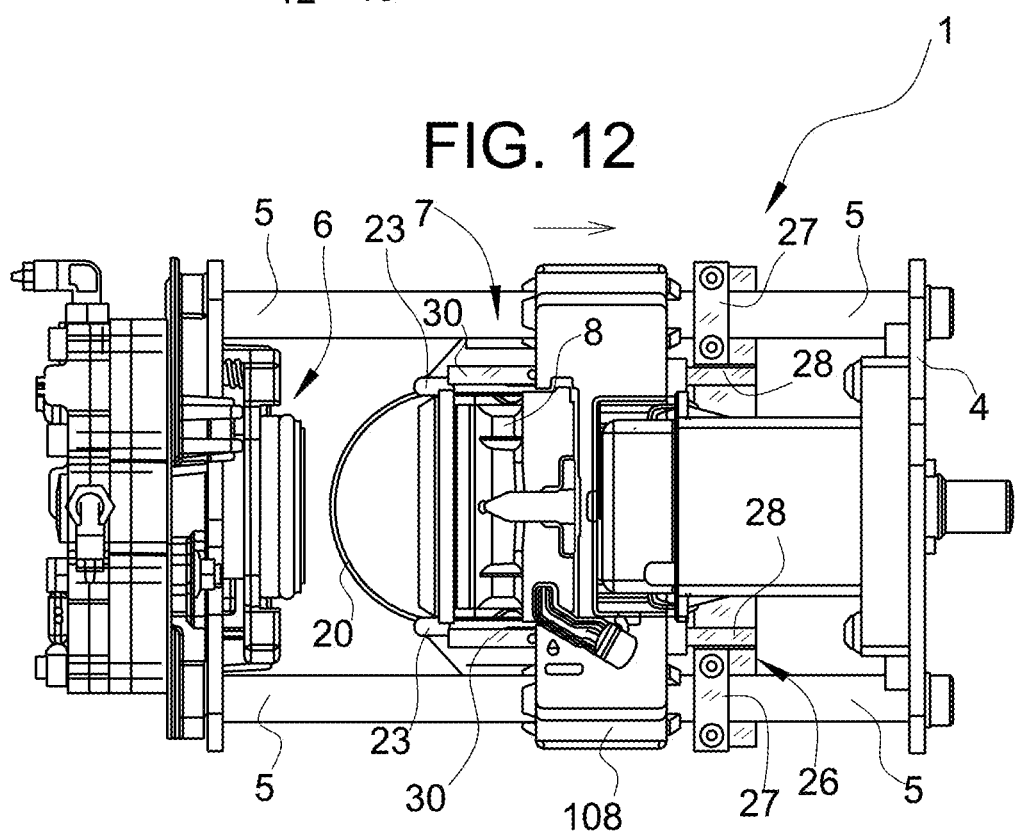

Actuation of the ejecting member 20 is controlled by a control mechanism (described below) essentially fixed to the stationary support structure 2 and cooperating with the movable assembly 7. In particular, said mechanism is designed to cause the ejecting member 20 to move from the idle position to the working position each time the movable assembly 7 is in a predetermined position on a return path to the open position, as shown in FIGS. 11 and 12.

In the embodiment shown, the ejecting member 20 has two end control arms, marked as 23 in the drawings and, as described below, the control mechanism is able to interact with said arms 23 to cause the member 20 to move from the working position when the movable assembly 7 is in the aforementioned predetermined position on a return path to the open position.

In FIG. 2 the control mechanism associated to the ejecting member 20 is marked as a whole as 24. This mechanism includes a transversal support bridge 26, fixed in a predetermined position to the rods 5 near to the end plate 4 by means of a pair of plates 27.

Two studs 28, parallel to one another and to the rods 5, are attached to the bridge 26. These studs extend through the corresponding through-holes 29 of the main body 108 of the movable assembly 7 (as shown in particular in FIGS. 1, 2*a*, 4*a*, 6*a*, 8*a* and 12*a*).

To the distal ends of the studs 28, oriented towards the cooperating assembly 6, are joined respective pushing members marked as 30 in the drawings.

These pushing members 30 are joined pivotingly around respective fixed axes (pivots 32), which are initially orthogonal to the direction of movement of the movable assembly 7, and in particular vertical.

Figure 4A:
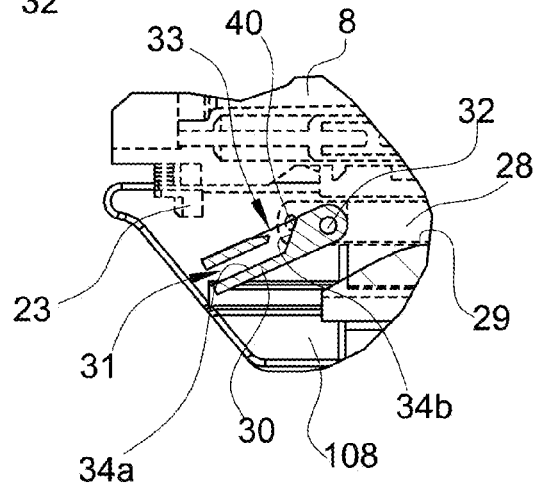
FIG. 4a is a partially cut away close-up view of a detail of FIG. 4.

As shown for example in FIG. 4*a*, the shape of the distal end of each pushing member 30 is essentially an inverted channel, and defines an axial passage 31 near to the associated pivot 32. The passage 31 near to the pivot 32 deviates towards a lateral aperture 33 oriented towards the body 8 of the movable assembly 7. In particular, the passage 32 has an external vertical wall with a distal section 34*a* essentially parallel to the longitudinal axis of the pushing member 30, and an arched proximal section 34*b* that substantially "pivots" around the pivot 32 and cooperates to delimit the lateral aperture 33.

As shown in FIGS. 2*a*, 4*a*, 6, 6*a* and 8, in the body 108 of the movable assembly 7 in front of the entrance to the passages 29 there are two forms 40 protruding vertically upwards, intended to cooperate with the pushing members 30 in the manner described below.

With reference to FIGS. 3, 4 and 4*a*, when the movable assembly 7 is in the open position, the pushing members 30 project out of the body 108, towards the cooperating assembly 6, and their surfaces 34*b* push against the protruding forms 40, such that they splay outwards, as shown in particular in FIGS. 4 and 4*a*. In this state, the pushing members 30 are not aligned with the control arms 23 of the ejecting member 20 (FIG. 4). In this state the pushing members 30 are in an inactive angular position.

Figure 6A:
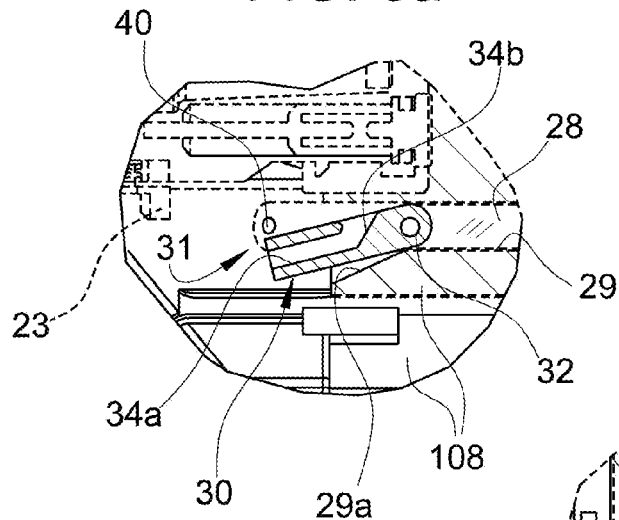
FIG. 6a is a partially cut away close-up view of a detail of FIG. 6.

When the movable receiving assembly 7 is moved towards the cooperating assembly 6, near to the closed position the pushing members 30 partially penetrate the apertures 29 in the main body 108, rotating around the respective pivots 32 towards the axis of the movable assembly 7, as shown in FIGS. 5, 6 and 6*a*. With reference to FIG. 6*a*, this penetration is advantageously facilitated by an arched shape 21*a* in the entrance part of the external wall of the passages 29.

In the initial phase of the movement of the movable assembly 7 from the open position to the closed position, the pushing members 30 again assume inactive angular positions, or positions not aligned with the control arms 23 of the ejecting member 20.

Figure 8A:
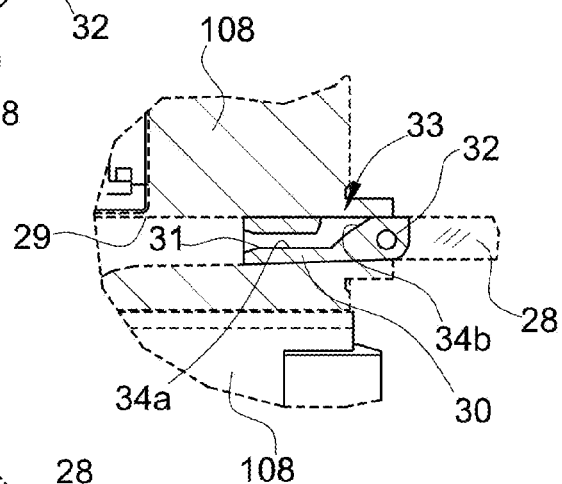
FIG. 8a is a partially cut away close-up view of a detail of FIG. 8.
Figure 12A:
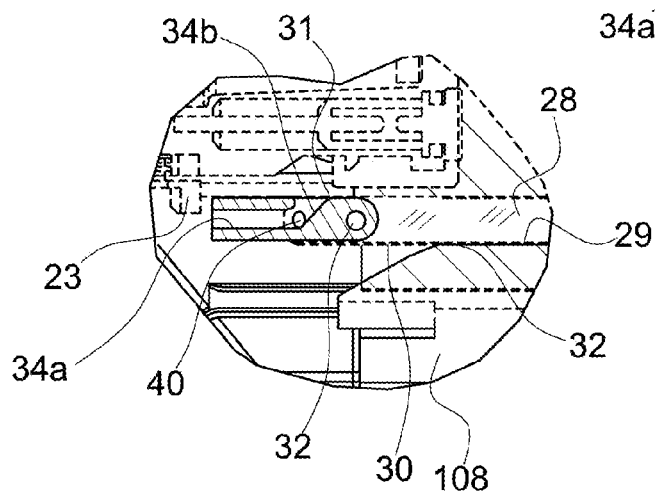
FIG. 12a is a partially cut away close-up view of a detail of FIG. 12.

In an intermediate phase and then in the final phase of that movement towards the closed position, the pushing members 30 assume a potentially active angular position, in which they are aligned with the studs 28 to which they are respectively joined, as shown in FIG. 8 and, even better, in FIG. 8*a*. These figures, and the corresponding FIG. 7, show the movable assembly 7 in the closed position against the cooperating assembly 6: in this state a stream of hot water and/or steam can be injected through the cooperating assembly 6 into the capsule or pod locked in the brewing chamber defined between those assemblies, and the beverage obtained may be dispensed through the output pipe 25.

When dispensing is completed, the movable assembly 7 moves back from the closed position, to the open position. This movement can be triggered by an actuator or more simply by elastic return means, in a known manner that is not illustrated.

Figure 9:
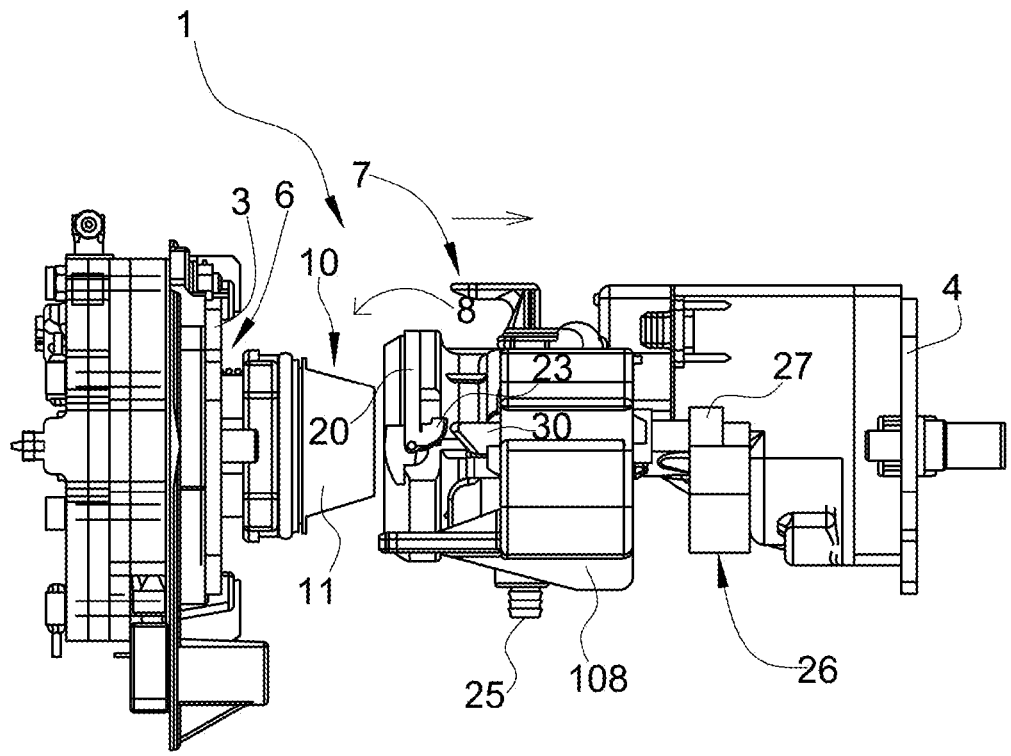
FIGS. 9 and 10 are side and top views respectively of the brewing apparatus shown with the movable assembly in an intermediate position on a return path to the open position.
Figure 10:
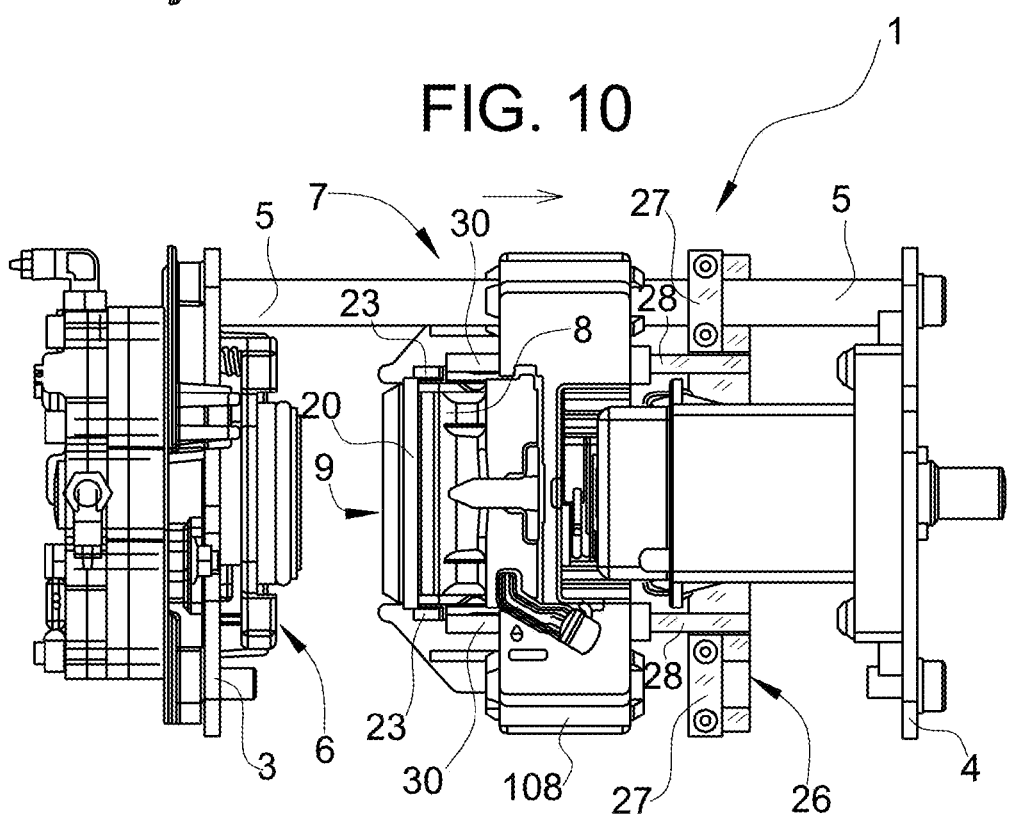

The relative movement of the assembly 7 towards the end plate 4 causes the pushing members 30 to again protrude outside the associated passages 29, from the part oriented towards the cooperating assembly 6, as shown in FIGS. 9 and 10. In the course of this movement the pushing members 30 with the respective axial passages 31 slide onto the protuberances 40 of the body 108 of the movable assembly 7. The setup is such that the protuberances 40 initially guide the pushing members 30 in their relative movement to approach the control arms 23 of the ejecting member 20, keeping them essentially aligned with those arms. This alignment is maintained until the pushing members 30 engage the control arms 23 of the ejecting member 20, as shown in FIGS. 9 and 10. This engagement causes the ejecting member 20 to rotate from the idle position shown in FIG. 9 to the working position shown in FIG. 11. The ejecting member 20 then impacts against the used capsule 10 which may still be in the space between the assemblies 6 and 7 and that has not naturally fallen through the action of gravity.

The ejecting member 20 is actuated just before the movable assembly 7 reaches the final open position. The subsequent necessary movement of the movable assembly 7 to reach this final open position, determines the engagement of the protruding forms 40 of its body 108 with the curved end sections 34*b* of the passages 31 of the pushing members 30, and a corresponding outwards rotation of those pushing members, again towards the position illustrated in FIG. 4*a*. In this state the protuberances 40 of the body 108 are again outside the pushing members 30, from which they are disengaged via the apertures 33.

The brewing apparatus 1 is then ready for a new operating cycle according to the method described above.

On the basis of the foregoing, it can be seen how the surfaces 34*a* and 34*b* (see for example FIG. 4*a*) of the internal passages 31 of the pushing members 30 act, in cooperation with the protuberances 40 of the movable assembly 7, as genuine cam surfaces, able to control the angular position of the pushing members 30 as a function of the position of the movable assembly 7.

Naturally, notwithstanding the invention principle, the means of implementation and the specific embodiments may vary greatly from that described and illustrated purely by way of a non-limiting example, without thereby moving outside the scope of the invention as defined in the attached claims.

The invention claimed is:

1. A brewing apparatus (1) for a machine for preparing beverages, comprising:

an operationally stationary guide and support structure (2), and which bears a movable receiving assembly (7) provided with a receptacle (9) configured to receive a capsule (10) or similar, containing a quantity or measure of a substance for the preparation of a beverage;

a substantially stationary cooperating assembly (6), the movable receiving assembly (7) being configured to assume a closed position in which it is coupled with the cooperating assembly (6) to define a brewing chamber configured to contain a capsule (10), and a separated open position, the cooperating assembly (6) being configured to permit injection of water and/or steam into the brewing chamber; and an ejector (20) for ejecting a used capsule (10) from the region between said assemblies (6, 7) when, after the beverage has been prepared, the movable receiving assembly (7) returns from the closed position to the open position;

wherein said ejector comprises:

an ejecting member (20) mounted pivotingly on the movable receiving assembly close to said receptacle (9) along a path intersecting said region, between an idle position in which it allows a capsule (10) to be inserted into said region, and a working position in which it is able to push a used capsule (10) downwards to eject it from said region; and a controller (24; 26-34) on said support structure (2) cooperating with the movable receiving assembly (7) to cause the ejecting member (20) to move from the idle position to the working position each time the movable receiving assembly (7) is in a predetermined position on a return path to the open position, wherein the receptacle (9) of the movable receiving assembly (7) has a substantially circular aperture, and the ejecting member (20) has an essentially semi-circular shape, and is mounted pivotingly close to the aperture of said receptacle (9).

2. Brewing apparatus according to claim 1, wherein the ejecting member (20) has at least one control arm (23) and the control mechanism (24; 26-34) is configured to interact with said at least one arm (23) to cause the ejecting member to move to the working position when the movable receiving assembly (7) is in said predetermined position on a return path to the open position.

3. Brewing apparatus according to claim 1, wherein the control mechanism (24; 26-34) comprises at least one pushing member (30) pivotable in said support structure (2) about a fixed axis (32) which is orthogonal to the direction of movement of the movable receiving assembly (7); said pushing member (30) having a cam-like profile (34*a*, 34*b*) able to cooperate with said movable receiving assembly (7) such that the pushing member (30) is configured to:

assume an inactive angular position in which it is not aligned with the path of said at least one control arm (23) of the ejecting member (20), when the movable receiving assembly (7) is in the open position, and as long as said assembly is moving towards the closed position;

assume an active angular position in which said pushing member (30) is aligned with and separated from said at least one arm (23) of the ejecting member (20), when the movable receiving assembly (7) reaches or is close to reaching the closed position; and maintain the active angular position and interacting with said at least one arm (23) to cause the ejecting member (20) to move to the working position, when the movable receiving assembly (7) passes through said predetermined position on a return path to the open position; and return to an inactive angular position when the movable receiving assembly (7) reaches or is close to reaching the open position.

4. Brewing apparatus according to claim 3, wherein said at least one pushing member (30) is pivotingly joined to one end of a stationary stud (28) which extends through a longitudinal passage (29) of the movable receiving assembly (7); said pushing member (30) having a shaped longitudinal guide (31) which can be engaged by a corresponding protruding formation (40) of the movable receiving assembly (7) when the movable receiving assembly is in the final phase of a return path to the closed position; said guide (31) having a control-cam profile (34*a*, 34*b*) shaped such that said protruding formation (40) of the movable receiving assembly (7) can control the return of the pushing member (30) from the active position to an inactive position in a final phase of the return path to the open position.

5. A brewing apparatus (1) for a machine for preparing beverages, comprising:
  an operationally stationary guide and support structure (2), and which bears a movable receiving assembly (7) provided with a receptacle (9) configured to receive a capsule (10) or similar, containing a quantity or measure of a substance for the preparation of a beverage;
  a substantially stationary cooperating assembly (6), the movable receiving assembly (7) being configured to assume a closed position in which it is coupled with the cooperating assembly (6) to define a brewing chamber configured to contain a capsule (10), and a separated open position, the cooperating assembly (6) being configured to permit injection of water and/or steam into the brewing chamber; and
  an ejector (20) for ejecting a used capsule (10) from the region between said assemblies (6, 7) when, after the beverage has been prepared, the movable receiving assembly (7) returns from the closed position to the open position;
  wherein said ejector comprises:
    an ejecting member (20) mounted pivotingly on the movable receiving assembly close to said receptacle (9) along a path intersecting said region, between an idle position in which it allows a capsule (10) to be inserted into said region, and a working position in which it is able to push a used capsule (10) downwards to eject it from said region; and
    a controller (24; 26-34) on said support structure (2) cooperating with the movable receiving assembly (7) to cause the ejecting member (20) to move from the idle position to the working position each time the movable receiving assembly (7) is in a predetermined position on a return path to the open position,
  wherein the control mechanism (24; 26-34) comprises at least one pushing member (30) pivotable in said support structure (2) about a fixed axis (32) which is orthogonal to the direction of movement of the movable receiving assembly (7); said pushing member (30) having a cam-like profile (34*a*, 34*b*) able to cooperate with said movable receiving assembly (7) such that the pushing member (30) is configured to:
    assume an inactive angular position in which it is not aligned with the path of said at least one control arm (23) of the ejecting member (20), when the movable receiving assembly (7) is in the open position, and as long as said assembly is moving towards the closed position;
    assume an active angular position in which said pushing member (30) is aligned with and separated from said at least one arm (23) of the ejecting member (20), when the movable receiving assembly (7) reaches or is close to reaching the closed position; and
    maintain the active angular position and interacting with said at least one arm (23) to cause the ejecting member (20) to move to the working position, when the movable receiving assembly (7) passes through said predetermined position on a return path to the open position; and
    return to an inactive angular position when the movable receiving assembly (7) reaches or is close to reaching the open position.

\* \* \* \* \*